J. C. Past,
Saw-Mill Head-Block.
N° 20,660. Patented June 22, 1858.
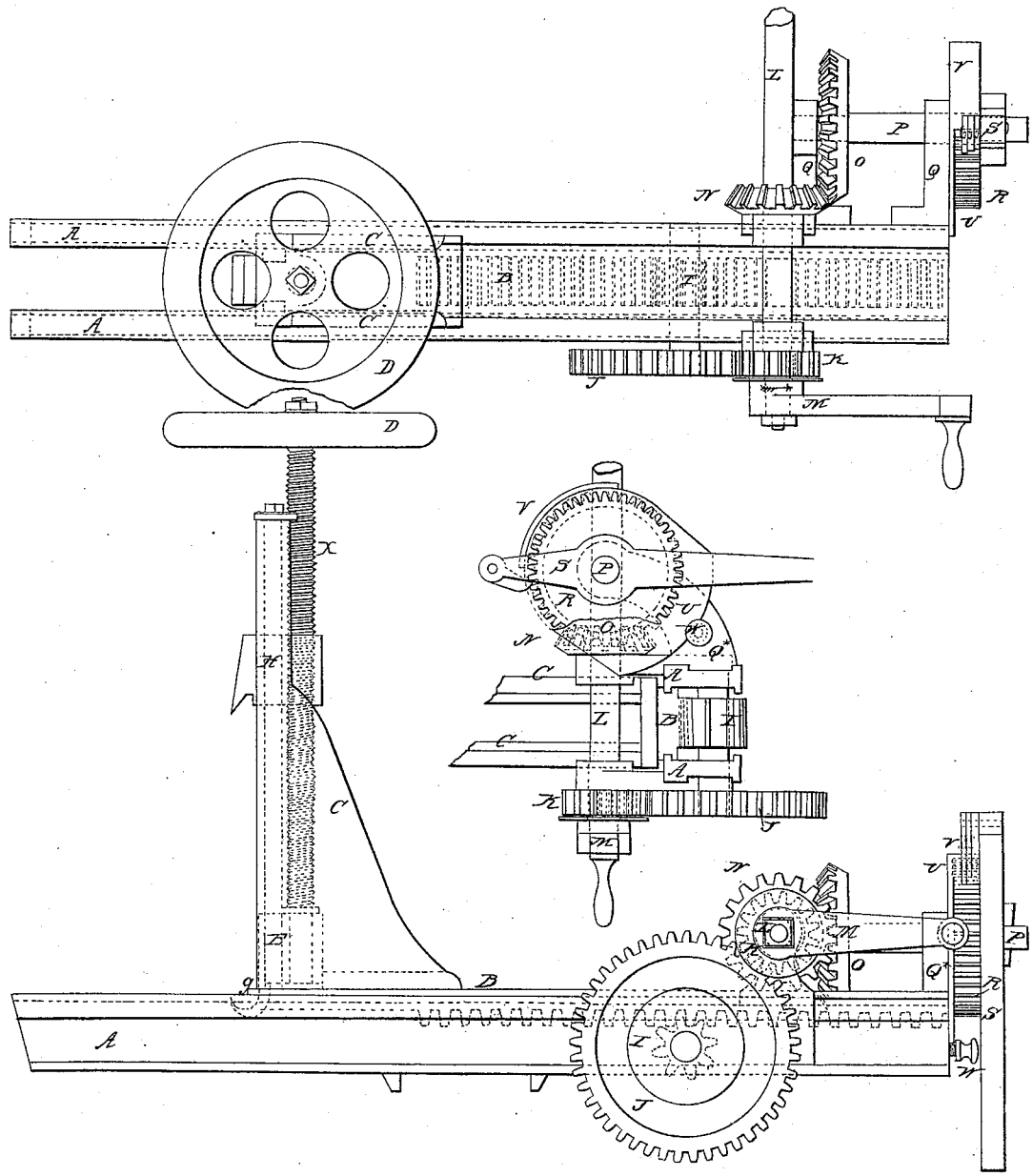

UNITED STATES PATENT OFFICE.

J. C. PAST, OF WILMINGTON, DELAWARE.

METHOD FOR CLAMPING AND LATERALLY FEEDING THE LOG IN SAWMILLS.

Specification of Letters Patent No. 20,660, dated June 22, 1858.

*To all whom it may concern:*

Be it known that I, J. COMLY PAST, of the city of Wilmington and State of Delaware, have invented certain new and useful Improvements in Head-Blocks for Sawmills; and I do declare the following to be a full and exact description thereof, reference being had to the annexed drawings and the letters marked thereon, forming a part of this specification.

Figure 1, is a top view or plan of a self-setting headblock with the improvements combined therewith. Fig. 2, is a side view of the same. Fig. 3, is an end view taken at the rear end.

The nature of my invention consists in providing and applying certain movable dogs or jaws, adjusted to the movable upright piece of the headblock which jaws are operated and controlled by a screw or other like device, for the purpose of holding the log securely in place during the operation of sawing it, and by means of which I am enabled to hold, a round, or any other form of log, securely in position until it is entirely sawed up into boards or planks, without the necessity of squaring off the ends of the logs or repeatedly turning it as is the case with the headblocks generally in use; also in providing and applying a movable guard or trigger, to the ratchet wheel, which is operated by the tumbler, in the self setting attachment, and which gives motion through the gear wheels and shafts, to the upright piece to which the log is secured. By means of this guard or trigger I control the amount of movement of the log and thus regulate the thickness of the stuff to be sawed at pleasure.

This form of headblock is intended for circular saw mills, but may be applied also to vertical or straight saws.

The bedpiece A may be made in any of the appropriate forms now in use, but I prefer that delineated in the drawings on account of compactness and strength, so also with the slide B, which may be a rack operated by a pinion or a nut moved by a screw. I prefer the rack and pinion, though a quick moving screw will answer. The upright or knee C instead of being made solid, as is the general practice, is parted in the center of the upright part thereof, so as to form guides or supports for the dogs or jaws as shown in the drawings, and these jaws must both slide freely up and down thereon. The front part of the jaws where they project beyond the face of the upright are shaped somewhat like a carpenter's bench hook, for the purpose of seizing hold on the side of the log, that part of them that projects from the rear of the guides is perforated with a hole in each to admit the screw, the lower one working between collars on the lower end of the screw and the upper one forming a nut through which the thread of the screw traverses. Upon the upper end of the screw the hand wheel D is placed whereby to revolve the screw.

To enable me to hold square as well as round logs, the tooth piece on the lower jaw is made in the form of a hook so as to permit the points to sink below the part of the bedpiece whereon the log rests. The upper tooth piece may be made in the same form reversed, but I prefer the form shown in the drawings for the reason that with it I can hold smaller stuff. The jaws can be operated by a rack and pinion but I prefer a screw on account of strength and simplicity.

Now to illustrate the manner of seizing and holding a log, let us suppose the lower jaw piece E in its place resting on the end of the slide B. It will be seen that the points of the tooth piece *g* are below the top of the bedpiece A and entirely out of the way. The upper jaw piece H is run up on the screw X by turning it backward until the jaw arrives near the upper end of the upright. The log is now to be rolled or pushed against the face of the uprights. Turn forward on the screw. This runs the upper jaw H down until the teeth strike the log. Continue turning and the lower jaw E rises until the teeth touch the lower side of the log. Continue turning until the teeth are driven into the log sufficiently to hold it firmly in place. It is now ready for sawing. When it is finished or we wish to loosen it we turn the screw in the reverse direction until we bring the tooth piece of the upper jaw out of the wood, and it is free. This comprises the first or principal part of my invention.

I will now proceed to describe the second part thereof or that which relates to regulating the amount of forward movement of the upright in setting the log and thereby controlling the thickness of the stuff sawed. The slide B as before stated may be made in any of the known forms either with the uprights forming a part thereof or they may be made separately and bolted on. This slide is moved forward or backward by revolving the pinion I which gears into the rack on the lower part of the slide. Upon the shaft of this pinion is placed the wheel J at the part where it projects beyond the side of the bedpiece. This wheel is set in motion by the pinion K upon the shaft L. This shaft is supported by uprights fastened to the bed piece A, so adjusted as to bring the pinion K properly into gear in the wheel J. Upon the shaft L just outside the pinion K is placed the winch M to be used when operating the set works by hand. Upon the opposite side of the headblock I place a bevel wheel N upon the shaft L. This is set in motion by the bevel wheel O, placed upon the shaft P which shaft is held in position at right angles to the shaft L by the curved supports Q, Q*, fastened to the side of the bed piece A, as shown in the drawings. Near the outer end of the shaft P is the ratchet wheel R and immediately alongside of this the tumbler S turns freely upon the shaft. This tumbler must be made with the lower end so much heavier than the upper one as to cause it to assume an upright position whenever left free. To the upper end of this tumbler S the clicks T, T, T are attached (by a pin on which they turn freely) in such a manner as to admit of them dropping into the teeth of the ratchet wheel R and turn it forward whenever the tumbler is moved in that direction. Now between the ratchet wheel R and the curved support Q* the disk U having the guard or trigger piece V attached to the edge thereof, is placed, and is held in position, by the shaft P passing through a hole in it, and the adjusting screw W which clamps it to the curved support Q* and at the same time admits of it being turned partly around upon the shaft P so as to vary the position of the guard V and cause it to disengage the clicks T, T, T, sooner or later as may be desirable. The tumbler S is operated by passing over an inclined plane, or trip cog, placed upon the floor of the mill or in a piece of timber properly adjusted in the line of motion of the tumbler when the carriage moves forward.

Let us suppose a log properly adjusted on the headblocks, as already described. By means of the winch M I turn the shaft L and pinion K in the direction indicated by the arrow. This turns the wheel J and the pinion I in the opposite direction and moves the rack and slide and the log forward until it comes into the proper position for taking off the first slab. I now start the feed gear and make the first cut, I then run the carriage back far enough to allow the tumbler to pass over the inclined plane or trip cog as the case may be, this throws the top of the tumbler carrying the clicks with it, back, until the points of the clicks are lifted and held from engaging in the teeth of the ratchet wheel by the guard or trigger V. When the lower end of the tumbler has passed entirely over the plane and moves toward an upright position, impelled by gravity, the guard or trigger keeps the clicks disengaged through a greater or smaller portion of the vibration just as the guard may be set and thus regulates the movement of the ratchet wheel and of course all those parts of the apparatus connected with it, or set in motion by it, for when the feed gear is again set in motion and the carriage moves forward the lower end of the tumbler coming in contact with the inclined plane is thrust back thereby and as the top is thrown forward the clicks take into the teeth of the ratchet wheel and carry it forward with them and through the gear wheels communicate motion to the rack and move the log forward a distance exactly proportioned to the amount of movement of the ratchet wheel. Hence it will be seen that by means of the guard or trigger, though the motion of the tumbler is always the same yet the amount of movement of the log is regulated at pleasure by adjusting the position of the guard or trigger.

Having thus described my invention and the method of applying it, what I claim is—

The method described of clamping and holding the log; and also the device by which the lateral feed of the log is regulated, substantially as hereinbefore described.

J. COMLY PAST.

Witnesses:
JOHN H. BELT,
JOHN JONES.